(12) United States Patent
Cordeiro et al.

(10) Patent No.: US 8,170,488 B2
(45) Date of Patent: May 1, 2012

(54) MITIGATION OF INTERNETWORK INTERFERENCE

(75) Inventors: Carlos Cordeiro, Portland, OR (US); Praveen Gopalakrishnan, Hillsboro, OR (US); Guoqing C. Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 980 days.

(21) Appl. No.: 12/215,157

(22) Filed: Jun. 25, 2008

(65) Prior Publication Data

US 2009/0233554 A1    Sep. 17, 2009

Related U.S. Application Data

(60) Provisional application No. 61/035,480, filed on Mar. 11, 2008.

(51) Int. Cl.
*H04B 1/00* (2006.01)

(52) U.S. Cl. ............. 455/63.1; 455/114.2; 455/278.1; 455/296; 370/338

(58) Field of Classification Search ............ 455/63.1, 455/114.2, 278.1, 296, 67.11, 115.1, 41.2; 370/338, 445, 466
See application file for complete search history.

(56) References Cited

U.S. PATENT DOCUMENTS

| | | | |
|---|---|---|---|
| 6,346,692 B1 * | 2/2002 | Ubowski et al. | 219/702 |
| 6,891,857 B1 * | 5/2005 | Nevo et al. | 370/480 |
| 6,954,616 B2 * | 10/2005 | Liang et al. | 455/63.1 |
| 7,167,484 B2 * | 1/2007 | Liang et al. | 370/445 |
| 7,215,659 B1 * | 5/2007 | Chen et al. | 370/338 |
| 7,233,602 B2 * | 6/2007 | Chen et al. | 370/445 |
| 7,280,801 B2 | 10/2007 | Dahl | |
| 7,408,907 B2 * | 8/2008 | Diener | 370/338 |
| 7,440,484 B2 * | 10/2008 | Schmidl et al. | 375/135 |
| 7,826,420 B2 * | 11/2010 | Habetha et al. | 370/329 |
| 7,941,149 B2 * | 5/2011 | Wang et al. | 455/445 |
| 7,957,356 B2 * | 6/2011 | Wang et al. | 370/338 |
| 2002/0021746 A1 * | 2/2002 | Schmidl et al. | 375/132 |
| 2002/0136183 A1 * | 9/2002 | Chen et al. | 370/338 |
| 2002/0136233 A1 * | 9/2002 | Chen et al. | 370/445 |
| 2004/0047324 A1 * | 3/2004 | Diener | 370/338 |
| 2006/0133451 A1 | 6/2006 | Birru et al. | |

(Continued)

FOREIGN PATENT DOCUMENTS

KR    10-2005-008410 A    8/2005

(Continued)

OTHER PUBLICATIONS

International Preliminary Report on Patentability received for PCT Patent Application No. PCT/US2009/036736, mailed on Sep. 23, 2010, 6 Pages.

*Primary Examiner* — Minh D Dao
(74) *Attorney, Agent, or Firm* — Malvern U. Griffin

(57) ABSTRACT

When a device in one wireless network receives interfering transmissions from an overlapping neighboring network, the neighboring network may be notified of the interference so that non-interfering schedules can be worked out. In one embodiment, the device receiving the interference may broadcast its own communications schedule. Device(s) in the interfering network may pick up that schedule, and pass it on to their controller, which can rearrange its own network schedule to be non-interfering. In another embodiment, the device receiving the interference may notify its own network controller with the pertinent information, and that controller may contact the controller of the interfering network to coordinate non-interfering schedules.

30 Claims, 5 Drawing Sheets

U.S. PATENT DOCUMENTS

| | | | |
|---|---|---|---|
| 2006/0268908 A1* | 11/2006 | Wang et al. | 370/401 |
| 2007/0105548 A1* | 5/2007 | Mohan et al. | 455/426.1 |
| 2007/0111790 A1* | 5/2007 | Maekawa et al. | 463/40 |
| 2010/0284380 A1* | 11/2010 | Banerjee et al. | 370/338 |
| 2011/0064072 A1* | 3/2011 | Wang et al. | 370/350 |

FOREIGN PATENT DOCUMENTS

| | | |
|---|---|---|
| WO | 2009/114583 A2 | 9/2009 |
| WO | 2009/114583 A3 | 11/2009 |

\* cited by examiner

MITIGATION OF INTERNETWORK INTERFERENCE

CROSS REFERENCE TO RELATED APPLICATIONS

This application is related to U.S. provisional patent application Ser. No. 61/035,480, filed Mar. 11, 2008, and claims priority to that filing date for all applicable subject matter.

BACKGROUND

Piconets are frequently used as small wireless networks, with a number of devices associating with each other, and with one of those devices becoming the piconet network controller (PNC) that schedules much of the communication within the network. In high density network environments, where numerous piconets may be formed in a relatively small area, the physical coverage areas of adjacent piconets may overlap, resulting in interference between devices in the different piconets. A typical PNC establishes a time slot for each device in its network to communicate during each superframe, and the device may continue to communicate in that same time slot for multiple (sometimes many) superframes. So when inter-network interference occurs, the interference may be repeated in every superframe for an extended period. However, although the interference may be predictable once it occurs, coordinating the schedules of different piconets to mitigate this interference may be difficult. In conventional systems it is limited mostly to either: 1) if the PNC's can communicate directly and therefore know of each other's schedule, at least one can schedule a network idle period for itself when the other network is active, so that inter-network interference does not occur, or 2) if the PNC's cannot communicate directly, the PNC responsibilities are reassigned to devices that are close enough to communicate directly with each other, and method 1) is then used. These techniques are not always effective or feasible. Scheduling a network idle period significantly reduces overall network bandwidth. Reassigning PNC responsibilities is a fairly complex and time-consuming process. In addition, reassigning the PNC duties to a device on one side of the piconet may move it out of range of another PNC in another adjacent piconet, thereby just moving the problem to a different piconet rather than solving the problem.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
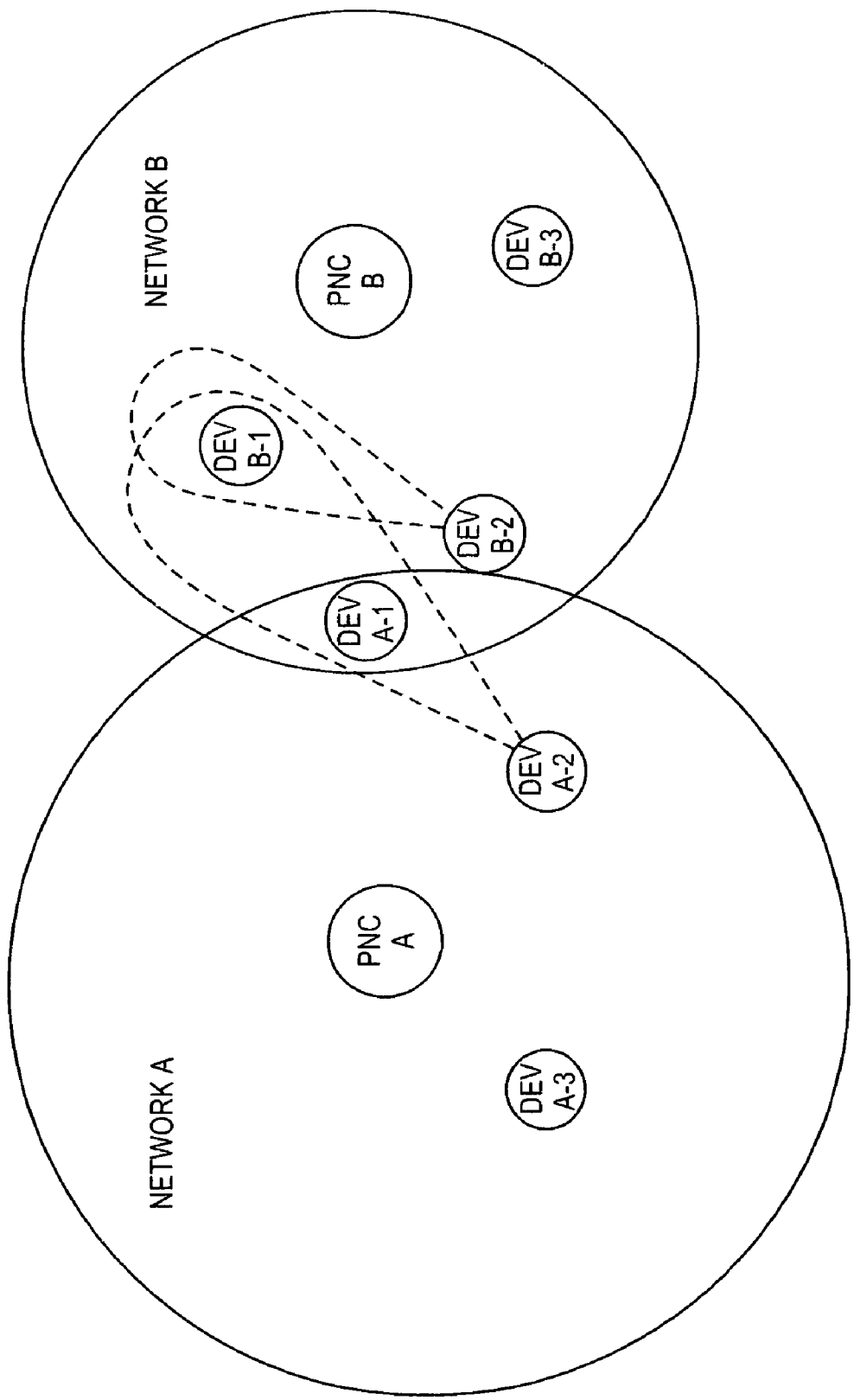
FIG. 1 shows a network diagram of two overlapping networks, with interference occurring between the two networks.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a tangible storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile" wireless device is used to describe a wireless device that may be in motion while it is communicating.

The descriptions in this document are generally written in terms of wireless communication networks known as piconets. However, the principals and techniques described may be used in other types of networks. Various embodiments of the invention are not intended to be limited to piconets unless specifically indicated in the claims.

Various embodiments of the invention use a non-controller network device to detect interference between two overlapping networks. Scheduling information is then communicated between the networks so that schedule coordination may be employed in at least one of the networks to avoid the interference. In one embodiment, the device detecting interference broadcasts scheduling information about its own scheduled communications. A device in the neighboring network picks up this broadcast and passes on the information to its own controller. That controller can then modify its own network schedule to avoid the interference. This technique may be used without the need for communication between the two controllers. In another embodiment, the device detecting interference informs its own controller of the interference, and its controller communicates with the neighboring controller to coordinate scheduling in a non-interfering manner. This technique requires that the two controllers can communicate with each other. In either embodiment, it is not necessary to re-assign the controller duties to another device, which can be a burdensome and time-consuming task.

FIG. 1 shows a network diagram of two overlapping networks, with interference occurring between the two networks. Network A comprises a piconet controller PNC-A and three associated network devices A-1, A-2, and A-3 that are registered with PNC-A, and whose communications may be substantially scheduled by PNC-A. Network B comprises a piconet controller PNC-B and three associated network devices B-1, B-2, and B-3 that are registered with PCN-B, and whose communications may be substantially scheduled by PNC-B. Every device in each network may have at least one antenna (multiple antennas for directional communications). Some or all the devices in each network may be mobile devices operating on battery power, although this is not a requirement unless otherwise specified. In the network configuration shown, device A-1 also falls within the coverage area of controller PNC-B, and may receive signals from both PNC-A and PNC-B, although it would typically ignore signals from PNC-B. Similarly, device B-2 is on the edge of PNC-A's coverage area, and might be able to receive and decode signals from PNC-A, but would normally ignore those signals.

Because some types of networks (such as piconets) are anticipated to frequently overlap, communications between devices in a network may be made directional to reduce potential interference from, and to, other devices. Devices with multiple co-located antennas can effectively make directional transmissions by transmitting slightly different signals from each antenna, which combine in such a way as to result in a relatively strong signal in a particular direction and a relatively weak signal in the other directions. Similarly, reception can be made directional by processing the signals from each of the antennas in a particular way that isolates signals received from a particular direction, while minimizing signals received from other directions. Both transmissions and receptions can be focused in a particular direction by determining the particular parameters of that processing through communications between the two particular devices. This is commonly called antenna training, and various forms of antenna training are known. Antenna training is not part of the novelty of the described embodiments of the invention and is not further described here.

In the particular example shown, device B-2 is transmitting directionally to device B-1 in network B, as shown by the teardrop-shaped transmission envelope. At the same time, device A-2 is transmitting directionally to device A-1 in network A. Unfortunately, because of the relative locations of devices A-1, A-2, B-1, and B-2, device B-1 may receive simultaneous signals from devices A-2 and B-2. If A-2 and B-2 are transmitting on the same or similar frequencies, the signal received by B-1 from A-2 may interfere with the signal received by B-1 from B-2. If the A-1/A-2 communications and B-1/B-2 communications are repeated at regular intervals, such as in the same time slots in repeating superframes, this interference may continue repeatedly for a long time, making communication from B-2 to B-1 difficult. Changing the time slots of one of these communication might solve the problem, but those time slots may be determined by the controllers, which may be unaware of each other's network schedules in a conventional system.

Figure 2:
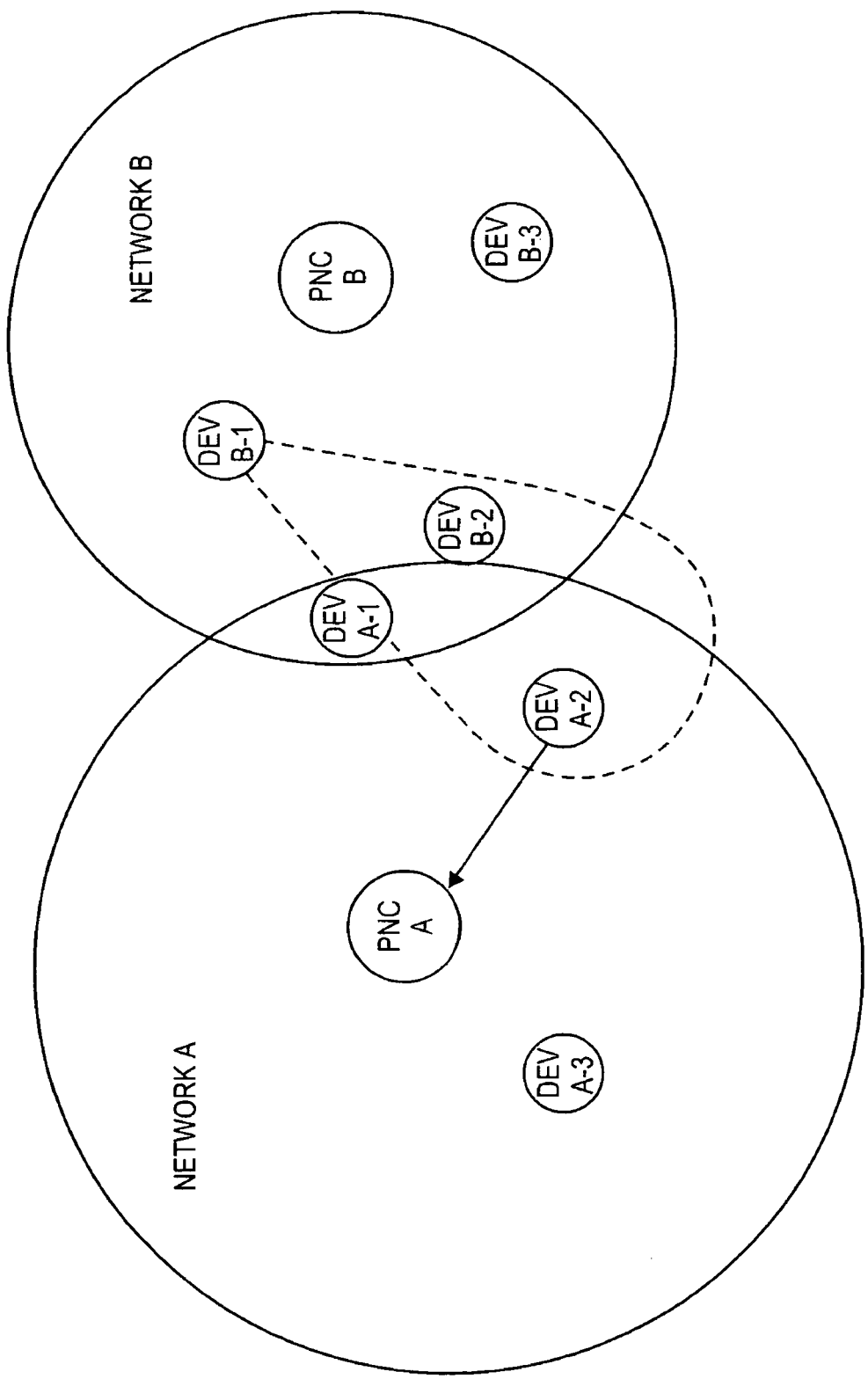
FIG. 2 shows a network diagram of an attempt to mitigate the interference of FIG. 1, according to an embodiment of the invention.
Figure 3:
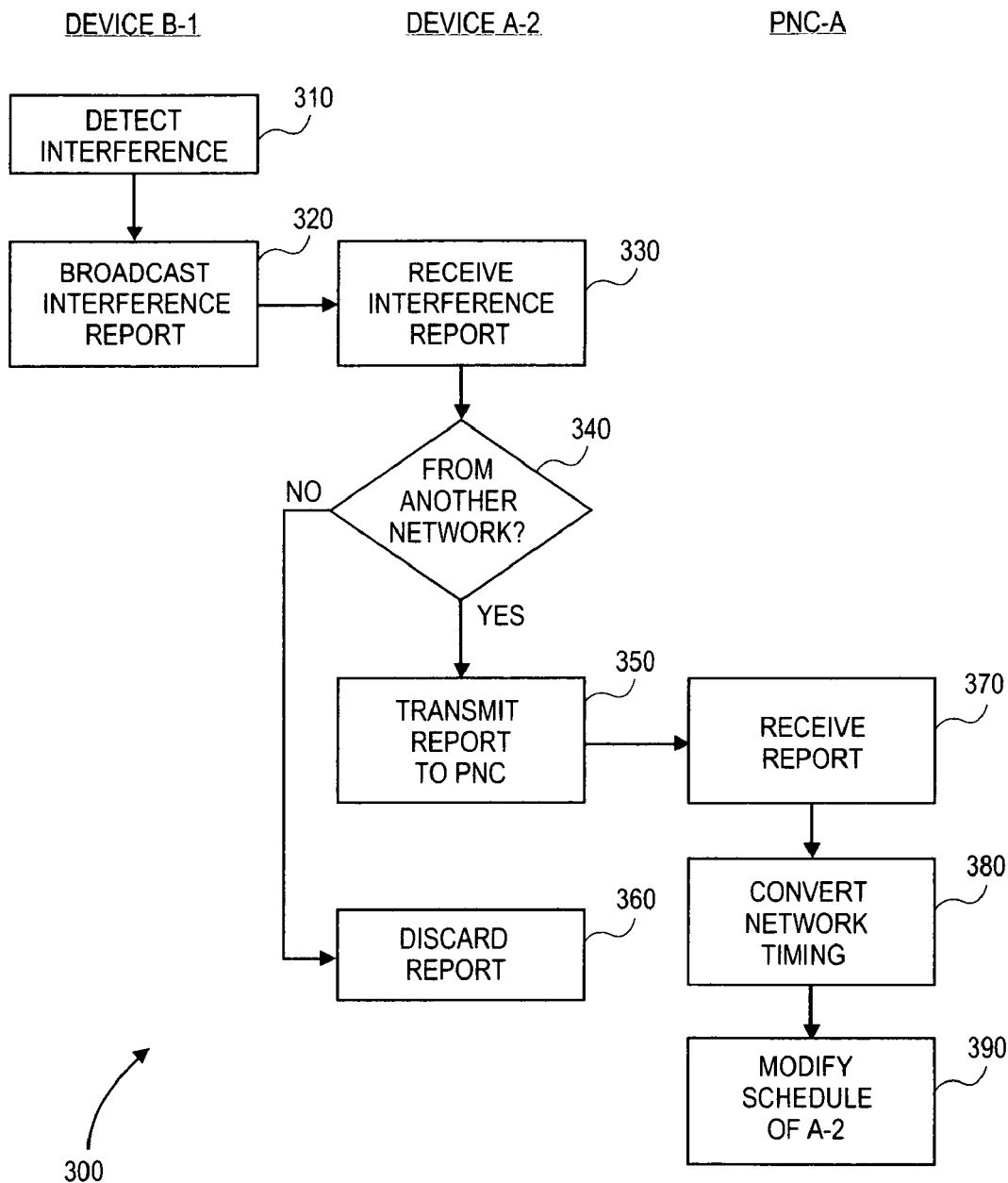
FIG. 3 shows a flow diagram of a method associated with the network diagram of FIG. 2, according to an embodiment of the invention.

FIG. 2 shows a network diagram of an attempt to mitigate the interference of FIG. 1, according to an embodiment of the invention. FIG. 3 shows a flow diagram 300 of a method associated with the network diagram of FIG. 2, according to an embodiment of the invention. The following description references both FIG. 2 and FIG. 3. In this embodiment, when device B-1 determines at 310 that it is getting inference from an adjacent network, B-1 may broadcast a report containing information about the interference at 320. The term 'broadcast', as used here, indicates that the transmission is not addressed to particular device, but is intended to be received and examined by any device capable of receiving it. The term 'report', as used here, may include any suitable format for reporting the information that is intended to be conveyed. The example shows the transmission is directional (again, as indicated by the teardrop-shaped transmission envelope), although other embodiments may use other techniques, such as an omnidirectional transmission. This broadcast is intended to be received by a device in network A, so the illustrated embodiment is directing the transmission toward the presumed source of the interference.

In some embodiments, the contents of this transmission may be in a format designed to report information about the interference. For example, the format may include things such as, but not limited to: 1) a field to indicate this transmission contains information about the interference, 2) the identification of the transmitting device, 3) the identification of the interfering device (if known), 4) the time the interference was experienced, 5) signal parameters such as bit error rate, frame error rate, signal-to-noise ratio, received power of the interfering signal, etc., 6) identification of the piconet, 7) etc.

This interference report may also contain the future reception schedule of the device that experienced the interference (e.g., device B-1), in the hope that the PNC in the other network will rearrange its own network schedules to avoid such interference in the future. In many networks, the schedules of the two network controllers will not be synchronized, so simply indicating the timing of the interference within a network B superframe (and similarly, the timing of the network schedule within a network B superframe) may not be meaningful to PNC-A. Therefore, other information may also be conveyed, directly or indirectly, to allow the timing information about a device in one network to be converted into timing relevant to another network. For example, the transmission from B-1 may contain information about when the next network B superframe begins (e.g., a time offset), as measured from a particular point in the transmission (for example, from the start of the header, from the end of the data, etc., though other points may be used instead). This information may then be added to the recorded reception time of the transmission, to determine when the next superframe of the transmitting device will start, allowing a conversion of the timing between the superframes of the two networks. Since the transmitting and receiving devices are close together, the transit time of the transmitted signal may be considered essentially instantaneous, and may be ignored in the calculations.

In the example of FIGS. 2-3, the notification of the interference and the future schedule of device B-1 may be received at 330 by device A-2, which can then forward the information at 350 to PNC-A through any feasible communication format that is acceptable within network A. After receiving the report at 370 and examining this information, at 380 PCN-A may convert the reported network timing to its own network timing as previously described, and at 390 PCN-A may reschedule the timing of any future transmissions from device A-2 to device A-1, to avoid that interfering time period within the network B superframe. In some embodiments, the timing of transmissions from device A-2 to devices other than A-1 may remain unchanged by this process, since they did not appear to cause interference for device B-1. If they caused interference with other devices in network B, those devices may also follow the overall process of FIG. 2 to report the information to PNC-A.

Although the broadcast transmission from B-1 may be directional, it might still be received by devices other than A-2. For example, device B-2 may also receive it. But since device B-2 is in the same network as B-1, and the format of the transmission indicates it is an interference report intended for another network, device B-2 may simply ignore the report. Since FIG. 3 shows the operations of device A-2 rather than B-2, this choice (to discard the report if it's from your own network) is shown at 340, 360, but a similar choice may be made by any non-PNC device in either network.

Another possibility is that another device in network A might also receive the transmission. For example, device A-1 might be close enough to the transmission envelope of device B-1 that A-1 also receives the message. In this case, device A-1 may also report the information to PNC-A (following operations 330-340-350), and PNC-A may simply ignore the redundant report from device A-1, while processing the report from device A-2.

Because the superframe timings of network A and network B are originally unsynchronized, device B-1 may not know when its transmission is able to be correctly received by a device in network A. For example, the interference report from device B-1 might be transmitted at a time when device A-2 is transmitting to device A-3, and device A-2 is therefore unable to detect/decode the transmission from device B-1. Because of uncertainties such as this, the interference report from device B-1 may have to be retransmitted multiple times, and at differing points with the superframes, until it is properly received. In some embodiments, device A-2 may reply to device B-1 with an acknowledgment when it successfully receives the interference report from device B-1. In other embodiments, in which no effective form of inter-network feedback exists, device B-1 may never know completely whether the interference report was successfully received, but could infer that when the interference stops.

Figure 4:
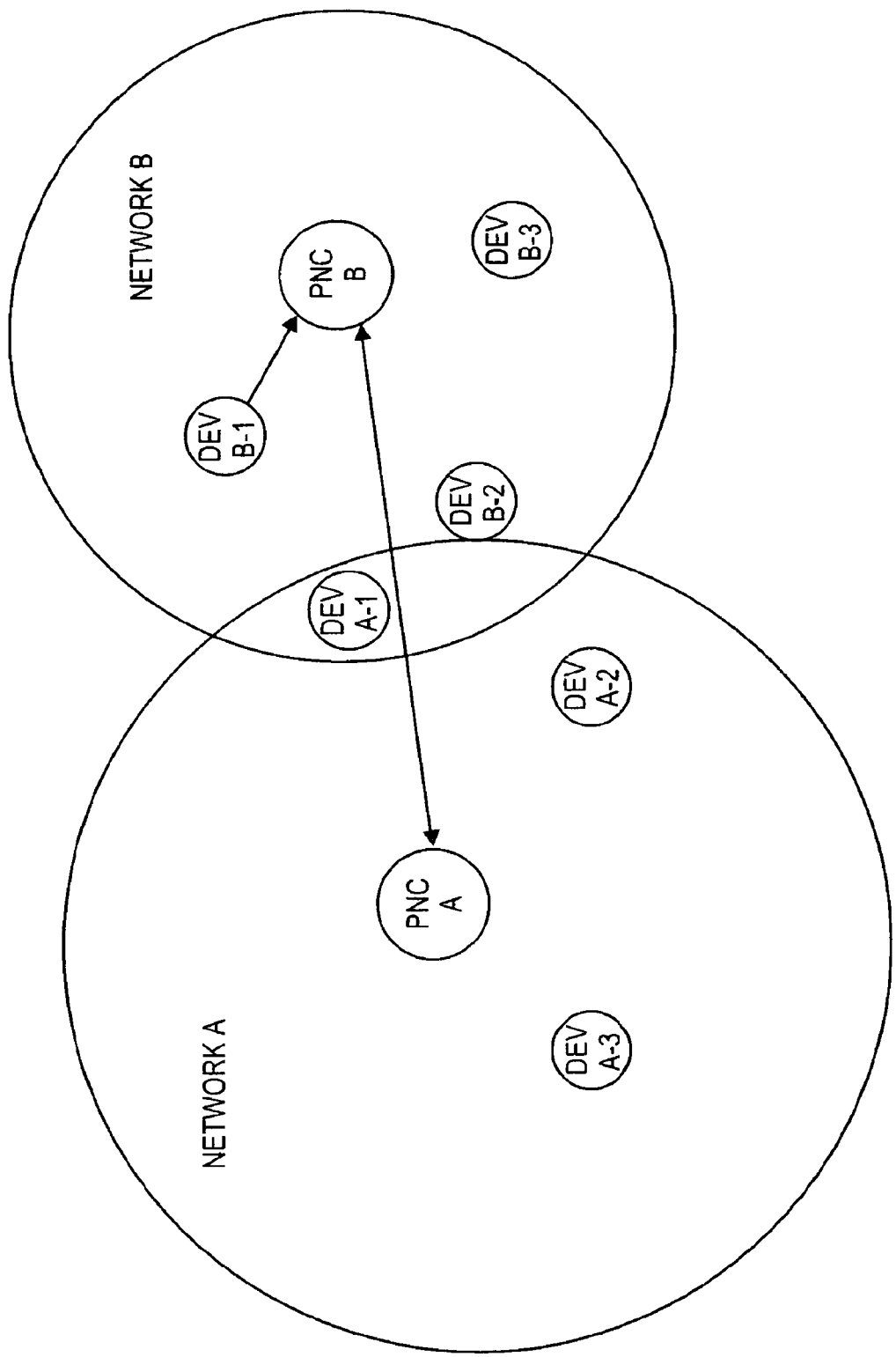
FIG. 4 shows another network diagram of an attempt to mitigate the interference of FIG. 1, according to a different embodiment of the invention than that shown in FIG. 2.
Figure 5:
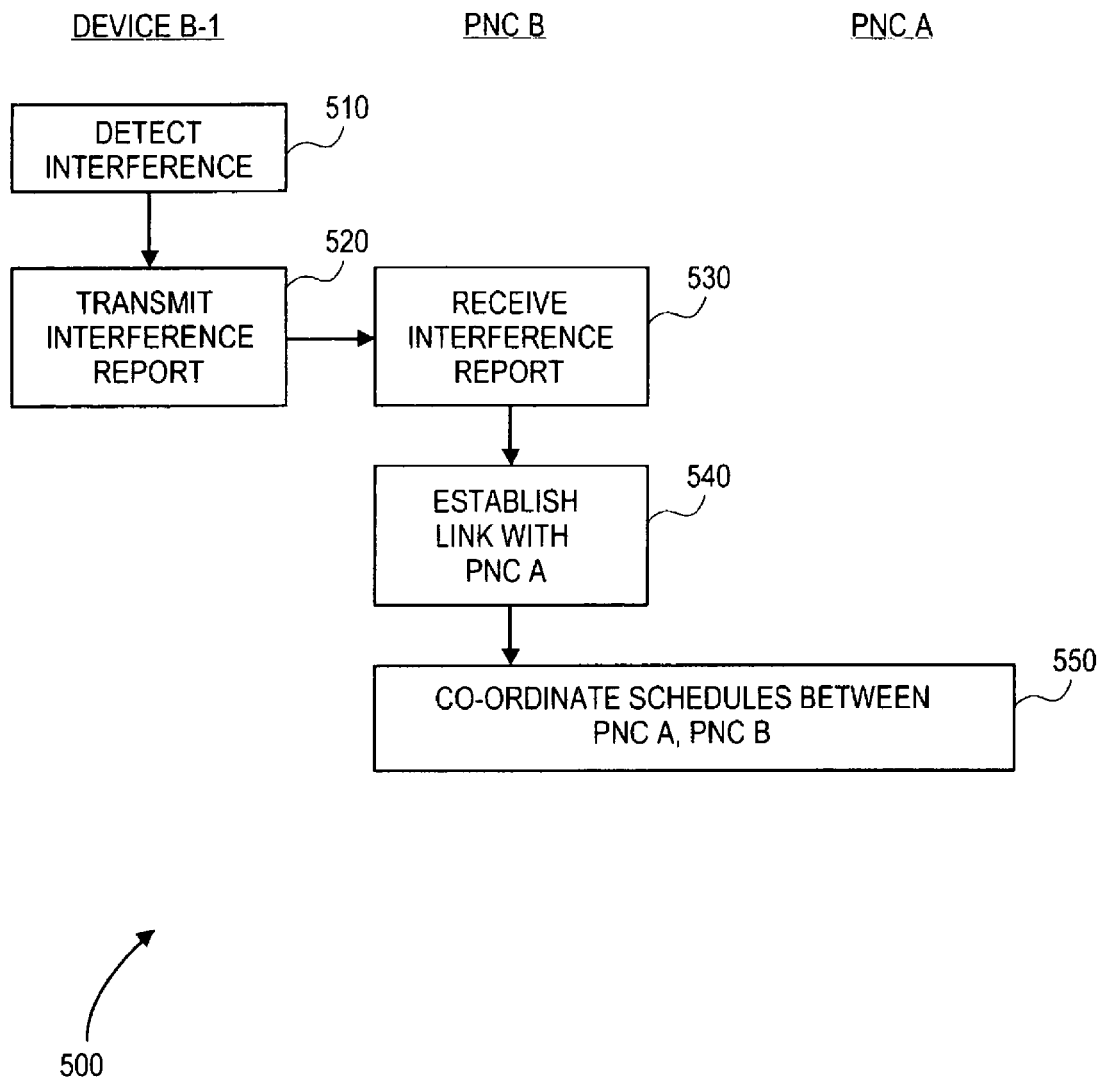
FIG. 5 shows a flow diagram of a method associated with the network diagram of FIG. 4, according to an embodiment of the invention.

FIG. 4 shows another network diagram of an attempt to mitigate the interference of FIG. 1, according to a different embodiment of the invention than that shown in FIG. 2. FIG. 5 shows a flow diagram 500 of a method associated with the network diagram of FIG. 4, according to an embodiment of the invention. The following description references both FIG. 4 and FIG. 5. As before, device B-1 may detect interference at 510 when it is trying to receive a transmission from a device in its own network. B-1 may then transmit an interference report at 520 to its own network controller, PNC-B. Rather than being a broadcast, this transmission may be a unicast transmission that is addressed to PNC-B.

The transmission may have a format designed specifically to report such interference to PNC-B, but this format may be different than the format described earlier for FIGS. 2-3. For example, this format may not contain the future communications schedule of device B-1, since that information is already known to PNC-B. But it may contain other information similar to that for the example of FIGS. 2-3, such as but not limited to: 1) a field to indicate this transmission contains information about the interference, 2) the identification of the transmitting device, 3) the identification of the interfering device (if known), 4) the time the interference was experienced, 5) signal parameters such as bit error rate, frame error rate, signal-to-noise ratio, received power of the interfering signal, etc., 6) etc.

Once PNC-B receives this report at 530, it may establish a communications link with PNC-A at 540. At 550, the two PNC's may then exchange information about their respective network schedules, and one or both PNC's may rearrange a part of its network schedule to avoid the reported interference. As before, the superframe timing between the two networks may be unsynchronized, so a common timing reference may need to be established by the two PNC's so they can convert superframe timings between the two networks. If the devices in the networks use directional transmissions, then only the timing of B-2 to B-1 transmissions and A-2 to A-1 transmissions may need to be considered for rescheduling, for the specific interference example shown in FIG. 1.

Although the embodiment of FIGS. 2-3 and the embodiment of FIGS. 4-5 both begin with interference being reported by the network device that experienced the interference, the methods of reporting differ between the two. In the first method, a notification of the interference is broadcast in the direction of the interfering network, along with the intended schedule of the device that experienced interference. This notification is picked up by a device in the interfering network and passed on to the network controller of the interfering network. That network controller may then change its own network schedule to avoid causing the interference. In the second method, the interference is reported to the network controller associated with the device experiencing interference, and that network controller then contacts the other network controller to negotiate a non-interfering coordination of schedules. A benefit of the first method is that the two network controllers don't have to be able to communicate with each other, so it can work even if the two network controllers are out of range of each other. A disadvantage of the first method is that only one PNC can adjust its network schedule, so there is a somewhat reduced chance that a non-interfering schedule can be worked out.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising
a first communications device for operating in a first wireless network, the first device to:
detect interference from a second wireless network during a scheduled reception time in the first wireless network; and
transmit a notification of the interference to a controller in the first wireless network.

2. The apparatus of claim 1, wherein the notification is to include at least one of:
a time of the interference; and
an identification of a device causing the interference.

3. The apparatus of claim 1, wherein the notification is to include a broadcast of a schedule of communications by the first device.

4. The apparatus of claim 1, further comprising at least one antenna coupled to the first device.

5. The apparatus of claim 1, wherein the first wireless network comprises a piconet.

6. An apparatus, comprising
a first network controller to operate in a first wireless network, the first network controller to:
receive, from a first mobile device in the first wireless network, a notification of interference to the first mobile device from a second wireless network;
notify a second network controller in the second wireless network of the interference; and
coordinate network schedules with the second network controller to avoid the interference.

7. The apparatus of claim 6, wherein said notifying the second network controller comprises providing at least one of:
a time indicator of the interference; and
an identification of an interfering device in the second wireless network.

8. The apparatus of claim 6, wherein the first wireless network is a piconet and the second wireless network is a piconet.

9. An apparatus, comprising
a first network controller in a first wireless network, the first network controller to:
receive, from a first mobile device in the first wireless network, a notification of an interference to a second mobile device in a second wireless network from the first wireless network;
receive, from the first mobile device, a schedule of intended communications by the second mobile device; and
rearrange a network communications schedule in the first wireless network to avoid a future interference with the intended communications.

10. The apparatus of claim 9, wherein the notification is to include an indicator of a time of the interference.

11. The apparatus of claim 9, wherein the notification is to include an identification of the second mobile device.

12. A method, comprising:
detecting, by a first device in a first wireless network, interference to the first device from a second wireless network during a scheduled reception time in the first wireless network;
transmitting from the first device, responsive to said detecting, a notification of the interference to a controller in the first wireless network.

13. The method of claim 12, wherein said transmitting the notification to the controller comprises notifying the controller of a time of the interference.

14. The method of claim 12, wherein said notifying comprises broadcasting a schedule of communications by the first device.

15. The method of claim 14, wherein said broadcasting the schedule comprises broadcasting an identification of the first device.

16. A method, comprising:
receiving, by a first controller in a first wireless network from a first device in the first wireless network, notification of interference to the first device from a second wireless network;
notifying a second controller in the second wireless network of the interference; and
coordinating network schedules with the second controller to avoid the interference.

17. The method of claim 16, wherein said notifying comprises providing a time indicator of the interference.

18. The method of claim 17, wherein said notifying comprises including an identification of an interfering device in the second wireless network.

19. A method, comprising:
receiving, by a first network controller in a first wireless network, a notification of interference to a first mobile device in a second wireless network and a schedule of reception times for the first mobile device from a device in the first wireless network; and
rearranging a network communications schedule in the first wireless network to avoid further occurrences of the interference during the scheduled reception times.

20. The method of claim 19, wherein said receiving comprises receiving the notification and the schedule from two separate devices in the first wireless network.

21. An article comprising
a tangible computer-readable medium that contains instructions, which when executed by one or more processors result in performing operations comprising:
detecting, by a first device in a first wireless network, interference to the first device from a second wireless network during a scheduled reception time in the first wireless network; and
transmitting from the first device, responsive to said detecting, a notification of the interference to a controller in the first wireless network.

22. The article of claim 21, wherein the operation of transmitting the notification to the controller comprises notifying the controller of a time of the interference.

23. The article of claim 21, wherein the operation of notifying comprises broadcasting a schedule of communications by the first device.

24. The article of claim 23, wherein the operation of broadcasting the schedule comprises making a directional transmission.

25. An article comprising
a tangible computer-readable medium that contains instructions, which when executed by one or more processors result in performing operations comprising:
receiving, by a first controller in a first wireless network from a first device in the first wireless network, notification of interference to the first device from a second wireless network;
notifying a second controller in the second wireless network of the interference; and
coordinating network schedules with the second controller to avoid the interference.

26. The article of claim 25, wherein the operation of notifying comprises transmitting a time indicator of the interference.

27. The article of claim 26, wherein said notifying comprises including an identification of an interfering device in the second wireless network.

28. A tangible computer-readable medium that contains instructions, which when executed by one or more processors result in performing operations comprising:
receiving, by a first network controller in a first wireless network, a notification of interference to a first mobile device in a second wireless network and a schedule of reception times for the first mobile device; and rearranging a network communications schedule in the first wireless network to avoid further occurrences of the interference during the scheduled reception times.

29. The article of claim 28, wherein the operation of receiving comprises receiving from a device in the first wireless network.

30. The article of claim 29, wherein the operation of receiving comprises receiving from two separate devices in the first wireless network.

* * * * *